(12) United States Patent
Kitabayashi

(10) Patent No.: US 8,542,710 B2
(45) Date of Patent: Sep. 24, 2013

(54) OPTICAL FIBER AMPLIFIER AND FIBER LASER APPARATUS USING THE SAME

(71) Applicant: Fujikura Ltd., Tokyo (JP)

(72) Inventor: Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/622,181

(22) Filed: Sep. 18, 2012

(65) Prior Publication Data

US 2013/0016741 A1    Jan. 17, 2013

Related U.S. Application Data

(63) Continuation of application No. PCT/JP2011/056654, filed on Mar. 18, 2011.

(30) Foreign Application Priority Data

Mar. 19, 2010   (JP) .................................. 2010-064992
Nov. 5, 2010    (JP) .................................. 2010-249220

(51) Int. Cl.
*H01S 3/00* (2006.01)
*H01S 3/063* (2006.01)

(52) U.S. Cl.
USPC .............................. 372/6; 372/70; 359/341.3

(58) Field of Classification Search
USPC .................... 372/6, 70; 359/341.3
See application file for complete search history.

(56) References Cited

U.S. PATENT DOCUMENTS 5,218,608 A    6/1993  Aoki
6,111,688 A *  8/2000  Kobayashi et al. ...... 359/337.13
6,212,310 B1 * 4/2001  Waarts et al. .................... 385/24
7,440,176 B2 * 10/2008 Fidric .......................... 359/341.3
7,768,700 B1 * 8/2010  Savage-Leuchs .......... 359/341.1
2002/0085803 A1  7/2002 Zarris et al.

FOREIGN PATENT DOCUMENTS

| JP | 04-250429 A | 9/1992 |
|----|-------------|--------|
| JP | 09-185090 A | 7/1997 |
| JP | 11-266047 A | 9/1999 |
| JP | 2002-217477 A | 8/2002 |
| JP | 2008-191580 A | 8/2008 |

OTHER PUBLICATIONS

International Search Report of PCT/JP2011/056654, mailing date of Apr. 12, 2011.

* cited by examiner

*Primary Examiner* — Jessica Stultz
*Assistant Examiner* — Michael Carter
(74) *Attorney, Agent, or Firm* — Westerman, Hattori, Daniels & Adrian, LLP

(57) ABSTRACT

An optical fiber amplifier (2) includes: a first pumping source (10); a second pumping source (20); an amplification optical fiber (3) in which an active element is doped; a first optical filter (15) coupled to the first pumping source (10) and one end of the amplification optical fiber (30), the first optical filter (15) transmitting a light at a wavelength the same as the wavelength of a first pumping light and reflecting a light at a wavelength the same as the wavelength of a second pumping light; and a second optical filter (25) coupled to the second pumping source (20) and the other end of the amplification optical fiber (3), the second optical filter (25) transmitting a light at a wavelength the same as the wavelength of the second pumping light and reflecting a light at a wavelength the same as the wavelength of the first pumping light.

25 Claims, 5 Drawing Sheets

OPTICAL FIBER AMPLIFIER AND FIBER LASER APPARATUS USING THE SAME

TECHNICAL FIELD

The present invention relates to an optical fiber amplifier and a fiber laser apparatus using the same, and more particularly to an optical fiber amplifier that is a bidirectional pumping type and can efficiently amplify a light and a fiber laser apparatus using the same.

BACKGROUND ART

A fiber laser apparatus is excellent in light collecting properties, provides a small beam spot of high power density, and can be manufactured in a non-contact manner, so that the fiber apparatus is used in various fields such as a laser beam machining field and a medical field. The fiber laser apparatus for use particularly in the machining field and the medical field provides high output.

An optical fiber amplifier is used in the fiber laser apparatus. In the optical fiber amplifier, a pumping light is input to an amplification optical fiber doped with an active element such as a rare earth element, and the input pumping light is absorbed in the active element. Thus, the active element is caused in an excited state, a light to be amplified is amplified by the stimulated emission of the active element in the excited state, and the light is output. Therefore, desirably, the pumping light input to the amplification optical fiber is absorbed in the active element with no waste. In order to cause the active element to absorb the pumping light with no waste as described above, it is efficient to prolong the amplification optical fiber. However, when the amplification optical fiber as prolonged, such a region is produced in which the ratio of an active element not caused in the excited state by the pumping light is high, and the light to be amplified and the amplified light tend to be absorbed in the active element in this region. As a result, in this optical fiber amplifier, although the pumping light is absorbed, with no waste, the conversion efficiency of the light to be amplified into the output light is degraded.

Therefore, in an optical fiber amplifier described in Patent Document 1 below, in order to efficiently absorb a pumping light, an optical multiplexer/demultiplexer separates a pumping light, which enters an amplification optical fiber but is not absorbed in the amplification optical fiber, from a signal light, and the separated pumping light is reflected off a total reflection film, and again enters the amplification optical fiber. As described above, the pumping light that once goes out from the amplification optical fiber is again caused to enter the amplification optical fiber, and thus the pumping light is efficiently absorbed in the active element of the amplification optical fiber for efficient amplification.

CITATION LIST

Patent Document

[Patent Document 1] Japanese Patent Application Laid-Open No. 9-185090

SUMMARY OF INVENTION

Objects to be Achieved by the Invention

However, the optical fiber amplifier described in Patent Document 1 is an optical fiber amplifier in which a pumping light enters only one end side of the amplification optical fiber. Also in a bidirectional pumping optical fiber amplifier in which a pumping light enters both end sides of an amplification optical fiber, it is desired to efficiently amplify a light as described above.

Therefore, it is an object of the present invention to provide an optical fiber amplifier, that is a bidirectional pumping type and can efficiently amplify a light and a fiber laser apparatus using the same.

Means for Achieving the Objects

An optical fiber amplifier according to the present invention is characterized by including: a first pumping source configured to output a first pumping light at a first wavelength; a second pumping source configured to output a second pumping light at a second wavelength different from the first wavelength; an amplification optical fiber including: a core in which an active element is doped, the active element being caused in an excited state by the first pumping light and the second pumping light; and a cladding covering the core, the first pumping light output from the first pumping source entering one end of the amplification optical fiber and the second pumping light output from the second pumping source entering other end of the amplification optical fiber; a first optical filter disposed on an optical path from the first pumping source to the one end of the amplification optical fiber and configured to transmit a light at a wavelength the same as a wavelength of the first pumping light and reflect a light at a wavelength the same as a wavelength of the second pumping light; and a second optical filter disposed on an optical path from the second pumping source to the other end of the amplification optical fiber and configured to transmit a light at a wavelength the same as a wavelength of the second pumping light and reflect a light at a wavelength the same as a wavelength of the first pumping light.

In this optical fiber amplifier, the first pumping light output from the first pumping source enters one end side of the amplification optical fiber through the first optical filter, the second pumping light output from the second pumping source enters the other end side of the amplification optical fiber through the second optical filter, and then an active element is excited by the first pumping light and the second pumping light. As described above, the optical fiber amplifier according to the present invention is a bidirectional optical fiber amplifier in which an amplification optical fiber is excited from both of one end side and the other end side.

Moreover, also in the case where a part of the first pumping light that enters one end side of the amplification optical fiber goes out from the other end side of the amplification optical fiber, the first pumping light that goes out from the amplification optical fiber is reflected off the second optical filter disposed on an optical path from the second pumping source to the other end of the amplification optical fiber, and again enters the amplification optical fiber. Similarly, also in the case where a part of the second pumping light that enters the other end side of the amplification optical fiber goes out from one end side of the amplification optical fiber, the first pumping light that goes out from, the amplification optical fiber is reflected off the first optical filter disposed on an optical path from the first pumping source to one end of the amplification optical fiber, and again enters the amplification optical fiber. The first pumping light and the second pumping light thus again enter the amplification optical fiber to further excite the active element. Therefore, the active element is efficiently excited by the first pumping light and the second pumping light, and the amplification optical fiber can efficiently amplify a light.

As described above, the optical fiber amplifier according to the present invention provides the first pumping light and the second pumping light at wavelengths different from each other, and includes the first optical filter that transmits the first pumping light but reflects the second pumping light and the second optical filter that transmits the second pumping light but reflects the first pumping light. Thus, bidirectional pumping is enabled, and the pumping lights can be efficiently used by the reflection of the pumping lights.

Generally, even a slight temperature increase degrades the reliability of the pumping source, so that it is desired to prevent a temperature increase as much as possible. Therefore, in accordance with the optical fiber amplifier according to the present invention, also in the case where the first pumping light goes out from the other end side of the amplification optical fiber, the first pumping light that goes out from the amplification optical fiber is reflected off the second optical filter as described above. Thus, the first pumping light is prevented from entering the second pumping source, and a temperature increase in the second pumping source caused by the first pumping light is prevented. Similarly, also in the case where the second pumping light goes out from one end side of the amplification optical fiber, the second pumping light that goes out from the amplification optical fiber is reflected off the first optical filter as described above. Thus, the second pumping light is prevented from entering the first pumping source, and a temperature increase in the second pumping light caused by the first pumping source is prevented. Therefore, this optical fiber amplifier can provide an excellent reliability although the optical fiber amplifier amplifies a light at a high amplification factor by bidirectional pumping.

It is noted that in the present specification, coupling means optical coupling unless otherwise specified.

Moreover, in the foregoing optical fiber amplifier, preferably, the first pumping light and the second pumping light enter the cladding of the amplification optical fiber.

According to this optical fiber amplifier, since cladding pumping can be implemented, it is possible to input a pumping light with a larger power, and it is possible to further increase an amplification factor.

Furthermore, in the foregoing optical fiber amplifier, preferably, the first pumping source is formed of a plurality of light sources, a plurality of first pumping light propagation fibers is further included, the first pumping light propagation fibers is individually coupled to the light sources of the first pumping source and the cladding of the amplification optical fiber, and the first optical filter is disposed between the first pumping source or the cladding of the amplification optical fiber and the first pumping light propagation fibers, or disposed in a midway of the first pumping light propagation fibers.

According to this optical fiber amplifier, the first pumping light output from the plurality of light sources of the first pumping source propagates through the plurality of first pumping light propagation fibers, and enters the cladding of the amplification optical fiber, so that it is possible to input a pumping light with a strong power. Moreover, in the case where the first optical filter is disposed in the midway of the first pumping light propagation fibers, or disposed between the first pumping source and the first pumping light propagation fibers, the plurality of first pumping light propagation fibers is coupled to the cladding of the amplification optical fiber. Thus, also in the case where a part of the second pumping light goes cut from one end side of the amplification optical fiber, it is possible to efficiently input the second pumping light going out from the amplification optical fiber to the first pumping light propagation fibers. Then, it is possible to reflect the second pumping light by the first optical filter disposed in the midway of the first pumping light propagation fibers, or disposed between the first pumping source and the first pumping light propagation fibers. Furthermore, in the case where the first optical filter is disposed between the cladding of the amplification optical fiber and the first pumping light propagation fibers, it is possible to reflect the second pumping light by the first optical filter with no second pumping light entering the first pumping light propagation fibers, also in the case where a part of the second pumping light goes out from one end side of the amplification optical fiber.

Moreover, in the foregoing optical fiber amplifier, preferably, the second pumping source is formed of a plurality of light sources, a plurality of second pumping light propagation fibers is further included, the second pumping light propagation fibers is individually coupled to the light sources of the second pumping source and the cladding of the amplification optical fiber, and the second optical filter is disposed between the second pumping source or the cladding of the amplification optical fiber and the second pumping light propagation fibers, or disposed in a midway of the second pumping light propagation fibers.

According to this optical fiber amplifier, the second pumping light output from the plurality of light sources of the second pumping source propagates through the plurality of second pumping light propagation fibers, and enters the cladding of the amplification optical fiber, so that it is possible to input a pumping light with a strong power. Moreover, in the case where the second optical filter is disposed in the midway of the second pumping light propagation fibers, or disposed between the second pumping source and the second pumping light propagation fibers, the plurality of second pumping light propagation fibers is coupled to the cladding of the amplification optical fiber. Thus, it is possible to efficiently input the first pumping light that goes out from the amplification optical fiber to the second pumping light propagation fibers also in the case where a part of the first pumping light goes out from the other end side of the amplification optical fiber. Then, it is possible to reflect the first pumping light by the second optical filter disposed in the midway of the second pumping light propagation fibers, or disposed between the second pumping source and the second pumping light propagation fibers. Furthermore, in the case where the second optical filter is disposed between the cladding of the amplification optical fiber and the second pumping light propagation fibers, it is possible to reflect the first pumping light by the second optical filter with no the first pumping light entering the second pumping light propagation fibers, also in the case where a part of the pumping light goes out from the other end side of the amplification optical fiber.

Moreover, in the foregoing optical fiber amplifier, a first optical fiber having a first core and a first cladding may be further included. The first core may be coupled to the core of the amplification optical fiber, and the first cladding may be coupled to the cladding of the amplification optical fiber on the one end side of the amplification optical fiber. The first pumping light may enter the cladding of the amplification optical fiber through the first cladding.

Furthermore, in the foregoing optical fiber amplifier, a second optical fiber having a second core and a second cladding may be further included. The second core may be coupled to the core of the amplification optical fiber, and the second cladding may be coupled to the cladding of the amplification optical fiber on the other end side of the amplification optical fiber. The second pumping light may enter the cladding of the amplification optical fiber through the second cladding.

Moreover, a fiber laser apparatus according to the present invention includes the optical fiber amplifier described above, in which a seed light is input from the one end side of the amplification optical, fiber to the core and an output light that the seed light is amplified is output from the other end side of the amplification optical fiber.

According to this fiber laser apparatus, it is possible to efficiently amplify and output the input seed light.

Moreover, a fiber laser apparatus according to the present invention includes: the optical fiber amplifier described above; a first mirror coupled to the core of the amplification optical fiber on one end side of the amplification optical fiber and configured to reflect a light having at least a part of a wavelength of a light of spontaneous emission emitted from the active element; and a second mirror coupled to the core of the amplification optical fiber on the other end side of the amplification optical fiber and configured to reflect a light at a wavelength the same as a wavelength of a light reflected off the first mirror at a reflectance lower than a reflectance of the first mirror.

According to this fiber laser apparatus, a light resonates between the first mirror and the second mirror, and it is possible to efficiently amplify and output this light.

Furthermore, in the foregoing fiber laser apparatus, preferably, the second pumping light is absorbed in the active element more than the first pumping light is.

Since the first pumping light output from the first pumping source and entering the amplification optical fiber propagates through one end side to the other end side of the amplification optical fiber while being absorbed in the active element, the power of the first pumping light on one end side is stronger than the power of the first pumping light on the other end side. Therefore, the first pumping light causes an active element in the excited state on one end side of the amplification optical fiber more than an active element on the other end side. On the other hand, since the second pumping light output from the second pumping source and entering the amplification optical fiber propagates through the other end side to one end side of the amplification optical fiber while being absorbed in the active element, the power of the second pumping light on the other end side is stronger than the power of the second pumping light on one end side. Therefore, the second pumping light causes an active element in the excited state on the other end side more than one end side of the amplification optical fiber. In the amplification optical fiber, the power of a seed light and the power of a resonating light are stronger on the output side. In other words, in the fiber laser apparatus described above, the power of a seed light and the power of a resonating light are stronger on the other end side of the amplification optical fiber more than on one end side. Therefore, on the other end side of in the amplification optical fiber, when the pumping light excites the active element, stimulated emission is caused by a light with a stronger power, and the active element is returned to the ground state. Therefore, in the amplification optical fiber, stimulated emission is efficiently caused on one end side more than on the other end side. In other words, the efficiency to amplify a light is excellent in the second pumping light more than in the first pumping light. Therefore, as described above, the second pumping light that more causes the active element in the excited state on the other end side is more absorbed in the active element than the first pumping light is, so that it is possible to more efficiently cause stimulated emission, and it is possible to more efficiently amplify a light.

Moreover, in the foregoing fiber laser apparatus, preferably, a wavelength of the second pumping light is a wavelength at which absorption efficiency of the active element is excellent more than a wavelength of the first pumping light.

With this configuration, the second pumping light is absorbed in the active element more than the first pumping light is, and it is possible to more efficiently amplify a light.

Furthermore, in the foregoing fiber laser apparatus, preferably, the power of the second pumping light is stronger than the power of the first pumping light.

Also with this configuration, the second pumping light is absorbed in the active element more than the first pumping light is, and it is possible to more efficiently amplify a light.

In addition, in the foregoing fiber laser apparatus, preferably, a wavelength of the second pumping light is longer than a wavelength of the first pumping light.

In the fiber laser apparatus, a high conversion efficiency is preferable in which a pumping light absorbed in the active element is converted into a light to be output. Then, when the active element is excited to cause stimulated emission, quantum efficiency is excellent as the wavelength of a pumping light to excite the active element is closer to the wavelength of the light to be output. Thus, it is possible to efficiently cause stimulated emission. Therefore, the wavelengths of the first pumping light and the wavelength of the second pumping light are set in such a way that the wavelength of the second pumping light is made closer to the wavelength of the light to be output than the wavelength of the first pumping light, and it is possible to more efficiently cause stimulated emission. In the typical fiber laser apparatus, since the wavelength of the light to be output is longer than the wavelength of the pumping light, the wavelength of the second pumping light is made longer than the wavelength of the first pumping light. Thus, it is possible to more efficiently cause stimulated emission, and it is possible to more efficiently amplify a light.

Effect of the Invention

As described above, according to the present invention, it is possible to provide an optical fiber amplifier that is a bidirectional pumping type and can efficiently amplify a light and a fiber laser apparatus using the same.

EMBODIMENTS OF THE INVENTION

In the following, preferred embodiments of an optical fiber amplifier according to the present invention and a fiber laser apparatus using the same will be described in detail with reference to the drawings.

First Embodiment

Figure 1:
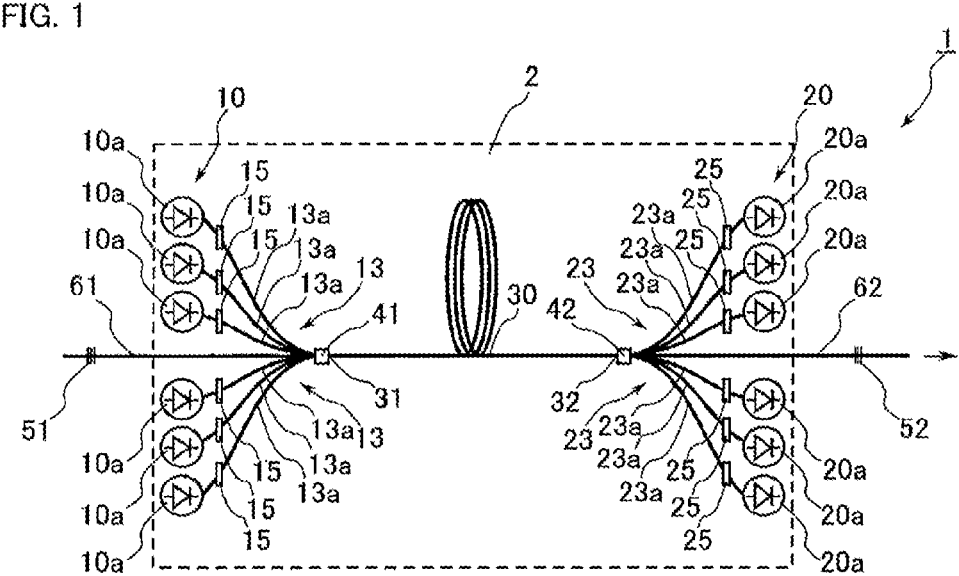
FIG. 1 is a diagram of a fiber laser apparatus according to a first embodiment of the present invention.

FIG. 1 is a diagram of a fiber laser apparatus according to a first embodiment of the present invention.

As depicted in FIG. 1, a fiber laser apparatus 1 includes an optical fiber amplifier 2. The optical fiber amplifier 2 includes a main configuration having a first pumping source 10, a first pumping port 13 coupled to the first pumping source 10, a second pumping source 20, a second pumping port 23 coupled to the second pumping source 20, an amplification optical fiber 30, a first optical coupler 41 that connects the first pumping port 13 to the amplification optical fiber 30, a second optical coupler 42 that connects the second pumping port 23 to the amplification optical fiber 30, a first optical filter 15 disposed in the midway of the first pumping port 13 and coupled to the first pumping port 13, and a second optical filter 25 disposed in the midway of the second pumping port 23 and coupled to the second pumping port 23. Moreover, the fiber laser apparatus 1 includes a first resonance port 61 coupled to the amplification optical fiber 30 through the first optical coupler 41, a first FBG (Fiber Bragg Grating) 51 that is a first mirror provided at the first resonance port 61, a second resonance port 62 coupled to the amplification optical fiber 30 through the second optical coupler 42, and a second FBG 52 that is a second mirror provided at the second resonance port 62.

The first pumping source 10 is formed of a plurality of laser diodes (light sources) 10a, and outputs a pumping light at a wavelength $\lambda 1$. A first pumping light has the wavelength $\lambda 1$ at a wavelength of 915 nm, for example. Similarly, the second pumping source 20 is formed of a plurality of laser diodes (light sources) 20a, and outputs a pumping light at a wavelength $\lambda 2$. A second pumping light has the wavelength $\lambda 2$ at a wavelength of 975 nm, for example.

Moreover, the first pumping port 13 is formed of a plurality of first pumping light propagation fibers 13a. The laser diodes 10a of the first pumping source 10 are individually coupled to the first pumping light propagation fibers 13a in such a way that the first pumping light enters one ends of the first pumping light propagation fibers 13a. A multimode fiber, for example, is named for the first pumping light propagation fibers 13a forming the first pumping port 13. In this case, the first pumping light propagates through the first pumping light propagation fibers 13a as a multimode light.

The first optical, filters 15 are individually disposed in the midway of the first pumping light propagation fibers 13a of the first pumping port 13 thus formed, and individually coupled to the first pumping light propagation fibers 13a. Thus, the first optical filter 15 is coupled to the first pumping source 10 through the first pumping light propagation fiber 13a. The first, optical filter 15 is configured in which the first optical filter 15 transmits a light at a wavelength the same as the wavelength $\lambda 1$ of the first pumping light and reflects a light at a wavelength the same as the wavelength $\lambda 2$ of the second pumping light. This first optical filter is formed of a dielectric multilayer optical filter, for example. This dielectric multilayer optical filter is formed in which materials with different refraction indexes are alternately stacked on each other. For a material used for the dielectric multilayer optical filter, silica ($SiO_2$), titanium oxide ($TiO_2$), tantalum oxide ($Ta_2O_5$), zirconia ($ZrO_2$), or the like is named. The film thickness and the combination of materials are appropriately selected in such a way that a light at a wavelength the same as the wavelength $\lambda 1$ of the first pumping light is transmitted and a light at a wavelength the same as the wavelength $\lambda 2$ of the second pumping light is reflected.

Moreover, the second pumping port 23 is formed of a plurality of second pumping light propagation fibers 23a. The laser diodes 20a of the second pumping source 20 are individually coupled to the second pumping light propagation fibers 23a in such a way that the second pumping light enters one ends of the second pumping light propagation fibers 23a. A multimode fiber, for example, is named for the second pumping light propagation fibers 23a forming the second pumping port 23. In this case, the second pumping light propagates through the second pumping light propagation fibers 23a as a multimode light.

The second optical filters 25 are individually disposed in the midway of the second pumping light propagation fibers 23a of the second pumping port 23 thus formed, and coupled to the second pumping light propagation fibers 23a. Thus, the second optical filter 25 is coupled to the second pumping source 20 through the second pumping light propagation fiber 23a. The second optical filter 25 is configured in which the second optical filter 25 transmits a light at a wavelength the same as the wavelength $\lambda 2$ of the second pumping light and reflects a light at a wavelength the same as the wavelength $\lambda 1$ of the first pumping light. This second optical filter is formed of a dielectric multilayer optical filter made of a material usable for the first optical filter, for example, and the film thickness and the combination of materials are appropriately selected in such a way that a light at a wavelength the same as the wavelength $\lambda 2$ of the second pumping light is transmitted and a light at a wavelength the same as the wavelength $\lambda 1$ of the first pumping light is reflected.

Figure 2:
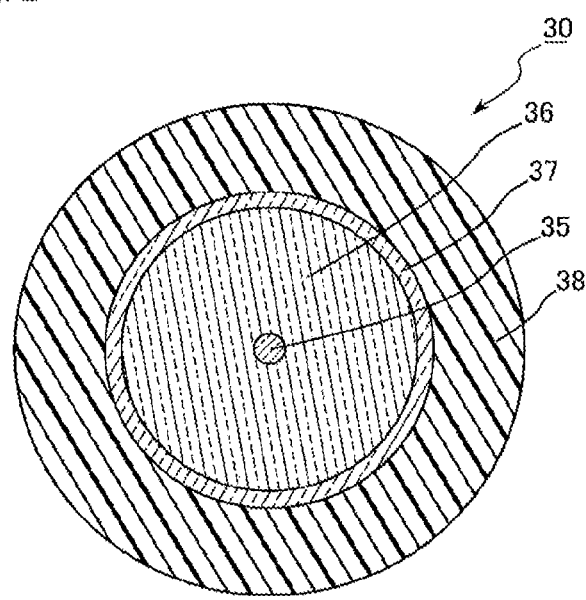
FIG. 2 is a diagram of the structure of an amplification optical fiber in a cross section vertical to the longitudinal direction in FIG. 1.

FIG. 2 is a diagram of the structure of the amplification optical fiber 30 in a cross section vertical to the longitudinal direction. As depicted in FIG. 2, the amplification optical fiber 30 is configured of a core 35, a cladding 36 that covers the core 35, an external cladding 37 that covers the cladding 36, and a protection cover layer 38 that covers the external cladding 37. The refraction index of the cladding 36 is lower than the refraction index of the core 35, and the refraction index of the external cladding 37 is further lower than the refraction index of the cladding 36. Moreover, for a material forming the core 35, for example, there is named silica doped with an element such as germanium to increase the refraction index and an active element such as ytterbium (Yb) excited by the first pumping light and the second pumping light. For this active element, a rare earth element is named. For the rare earth element, thulium (Tm), cerium (Ce), neodymium (Nd), europium (Eu), erbium (Er), or the like is named in addition to Yb described above. Furthermore, for the active element, bismuth (Bi), chromium (Cr), or the like is named in addition to the rare earth element. In addition, for a material forming the cladding 36, pure silica with no dopant, for example, is named. Moreover, for a material forming the external cladding 37, an ultraviolet cure resin, for example, is named. For a material forming the protection cover layer 38, for example, an ultraviolet cure resin different from a resin forming the external cladding 37 is named.

Furthermore, the first resonance port 61 coupled to the amplification optical fiber 30 is formed of an optical fiber such as a single mode fiber, for example, and the first FBG 51 is provided at the core of the first resonance port 61. As described above, in the case where the first FBG 51 has the active element of Yb, the reflectance is 100%, for example, at a wavelength of 1070 nm, for example.

In addition, the second resonance port 62 is formed of an optical fiber similar to the first resonance port, for example, and the second FBG 52 is provided at the core of the optical fiber forming the second resonance port 62. It is noted that the second FBG 52 has the same reflection wavelength as the reflection wavelength of the first FBG 51, and the reflectance is lower than the reflectance of the first FBG 51; the reflectance is 4%, for example.

As described above, the first optical coupler 41 connects the amplification optical fiber 30 to the first pumping port 13 and to the first resonance port 61. More specifically, at the first optical coupler 41, the end surfaces of the cores of the plurality of first pumping light propagation fibers 13a forming the first pumping port 13 are connected to the cladding 36 at one end 31 of the amplification optical fiber 30, and the first pumping light propagation fibers 13a are coupled to the cladding 36. Therefore, the first optical filter 15 is disposed on an optical path from the first pumping source 10 to the one end 31 of the amplification optical fiber 30, and coupled to the cladding 36 of the amplification optical fiber 30 through the first pumping light propagation fiber 13a. Moreover, at the first optical coupler 41, the end surfaces of the cores of the optical fibers forming the first resonance port 61 are connected to the core 35 of the amplification optical fiber 30, and the cores of the optical fibers are optically coupled to the core 35 of the amplification optical fiber 30. Thus, the first FBG 51 is optically coupled to the core 35 of the amplification optical fiber 30 through the core of the first resonance port 61.

Furthermore, as described above, the second optical coupler 42 connects the amplification optical fiber 30 to the second pumping port 23 and to the second resonance port 62. More specifically, at the second optical coupler 42, the end surfaces of the cores of the plurality of second pumping light propagation fibers 23a forming the second pumping port 23 are connected to the cladding 36 at an other end 32 of the amplification optical fiber 30, and the second pumping light propagation fibers 23a are coupled to the cladding 36. Therefore, the second optical filter 25 is disposed on an optical path from the second pumping source 20 to the other end 32 of the amplification optical fiber 30, and coupled to the cladding 36 of the amplification optical fiber 30 through the second pumping light propagation fiber 23a. Moreover, at the second optical coupler 42, the end surfaces of the cores of the optical fibers forming the second resonance port 62 are connected to the core 35 of the amplification optical fiber 30, and the cores of the optical fibers are optically coupled to the core 35 of the amplification optical fiber 30. Thus, the second FBG 52 is optically coupled to the core 35 of the amplification optical fiber 30 through the core of the second resonance port 62.

Next, the operation of the fiber laser apparatus 1 will be described.

First, the first pumping light at the wavelength $\lambda 1$ is output from the first pumping source 10. The wavelength $\lambda 1$ in this output is at a wavelength of 915 nm, for example, as described above. The first pumping light output from the first pumping source 10 propagates through the first pumping light propagation fibers 13a of the first pumping port 13, and passes through the first optical filter 15. The first pumping light then further propagates through the first pumping light propagation fibers 13a, and enters the cladding 36 from the one end 31 of the amplification optical fiber 30 through the optical coupler 41. The first pumping light that enters the amplification optical fiber 30 mainly propagates through the cladding 36 of the amplification optical, fiber 30, and the first pumping light is absorbed in the active element doped in the core 35 to cause the active element in the excited state when passing through the core 35.

In this propagation, the first pumping light not absorbed in the active element at the amplification optical fiber 30 mainly propagates through the cladding 36, goes out from the other end 32 of the amplification optical fiber 30, and propagates through the second pumping light propagation fibers 23a of the second pumping port 23. The first pumping light propagating through the second pumping light propagation fibers 23a is then reflected off the second optical filters 25 disposed in the midway of the second pumping light propagation fibers 23a, and again enters the cladding 36 of the amplification optical fiber 30 from the other end 32. The first pumping light is absorbed in the active element while propagating through the amplification optical fiber 30.

Similarly, the second pumping light at the wavelength $\lambda 2$ is output from the second pumping source 20. The wavelength $\lambda 2$ in this output is a wavelength of 975 nm, for example, as described above. The second pumping light output from the second pumping source 20 propagates through the second pumping light propagation fibers 23a of the second pumping port 23, and passes through the second optical filter 25. The second pumping light then further propagates through the second pumping light propagation fibers 23a, and enters the cladding 36 from the other end 32 side of the amplification optical fiber 30 through the optical coupler 42. The second pumping light that enters the amplification optical fiber 30 mainly propagates through the cladding 36 of the amplification optical fiber 30, and is absorbed in the active element doped in the core 35 to cause the active element in the excited state when passing through the core 35.

In this propagation, the second pumping light not absorbed in the active element at the amplification optical fiber 30 mainly propagates through the cladding 36, goes out from the one end 31 of the amplification optical fiber 30, and propagates through the first pumping light propagation fibers 13a of the first pumping port 13. The second pumping light propagating through the first pumping light propagation fibers 13a is then reflected off the first optical filters 15 disposed in the midway of the first pumping light propagation fiber 13a, and again enters the cladding 36 of the amplification optical fiber 30 from the one end 31. The second pumping light is absorbed in the active element while propagating through the amplification optical fiber 30.

The light of spontaneous emission is emitted from the active element thus caused in the excited state by the first pumping light and the second pumping light, and optical resonance occurs between the first FBG 51 and the second FBG 52 based on the light of spontaneous emission. The resonant light has the same wavelength as the reflection wavelengths of the first FBG 51 and the second FBG 52, and the resonant light is amplified as the light to be amplified by the stimulated emission of the active element excited at the amplification optical fiber 30. A part of the amplified light, then passes through the second FBG 52, and goes out as an output light.

It is noted that preferably, the second pumping light is absorbed in the active element more than the first pumping light is. This is because the first pumping light that enters the amplification optical fiber 30 from the one end 31 side of the amplification optical fiber 30 as described above propagates through the one end 31 side to the other end 32 side of the amplification optical fiber 30 while being absorbed in the active element. Thus, the power of the first pumping light on the one end 31 side is stronger than the power of the first pumping light on the other end 32 side. Therefore, the first pumping light causes the active element in the excited state on the one end 31 side of the amplification optical fiber 30 more than the active element on the other end 32 side. On the other hand, since the second pumping light that enters the amplification optical fiber 30 from the other end 32 side of the amplification optical fiber 30 propagates through the other end 32 side to the one end 31 side of the amplification optical fiber 30 while being absorbed in the active element, the power of the second pumping light on the other end 32 side is stronger than the power of the second pumping light on the one end 31 side. Therefore, the second pumping light causes the active element in the excited state on the other end 32 side of the amplification optical fiber 30 more than the active element on the one end 31 side. The power of a light that resonates in the amplification optical fiber 30 is greater on the other end 32 side that is the output side. Thus, on the other end 32 side of the amplification optical fiber 30, stimulated emission is caused by a light with power stronger than the power of a light on the one end 31 side even though the active element is excited by the pumping light. Therefore, in the amplification optical fiber 30, stimulated emission more efficiently occurs on the other end 32 side than on the one end 31 side, and the rate at which the active element returns to the ground state is high. Thus, the second pumping light that more causes the active element in the excited state on the other end 32 side is more absorbed in the active element than the first pumping light is, so that stimulated emission is more efficiently caused, and a light can be more efficiently amplified.

Figure 3:
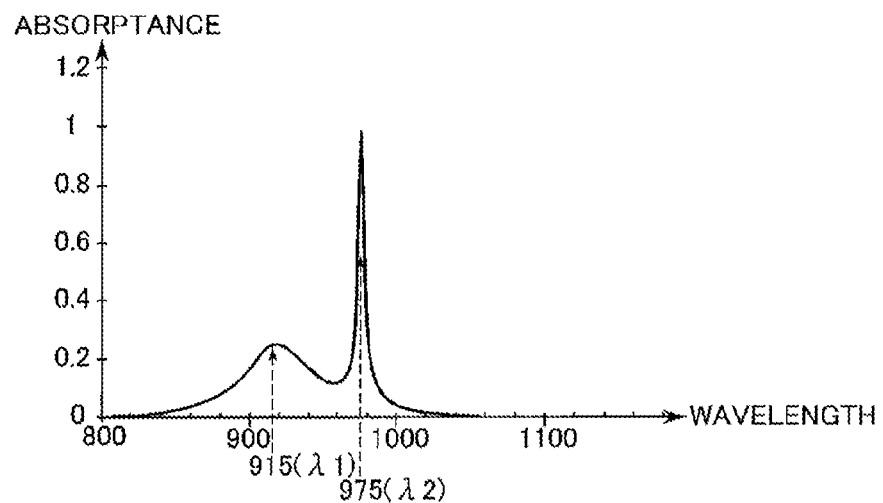
FIG. 3 is an exemplary diagram of the absorption rate of an active element to the wavelength of light.

As described above, in order to cause the second pumping light to be absorbed in the active element more than the first pumping light is, for example, it is sufficient that the wavelength $\lambda 2$ of the second pumping light is a wavelength of an excellent absorption efficiency caused by the active element more than the wavelength $\lambda 1$ of the first pumping light. FIG. 3 is an exemplary diagram of the absorption rate of the active element (Yb) to the wavelength of light. As depicted in FIG. 3, in the absorption spectrum of the pumping light, a peak of the highest absorptance of the pumping light is formed near a wavelength of 975 nm. A peak that the absorptance is lower than the absorptance near a wavelength of 975 nm is formed near a wavelength of 915 nm. Therefore, for example, as depicted in FIG. 3, suppose that the wavelength $\lambda 2$ of the second pumping light is at a wavelength of 975 nm where the absorption rate of the active element is high and the wavelength $\lambda 1$ of the first pumping light is at a wavelength of 915 nm where the absorption rate of the active element is relatively low, the second pumping light is absorbed in the active element more than the first pumping light is.

Alternatively, in order to cause the second pumping light to be absorbed in the active element more than the first pumping light is, it is sufficient that the first pumping light and the second pumping light are output in such a way that the power of the second pumping light, that enters the amplification optical fiber 30 is larger than the power of the first pumping light. In this output, the wavelength $\lambda 2$ of the second pumping light may be a wavelength of an efficient absorption by the active element more than the wavelength $\lambda 1$ of the first pumping light.

Moreover, a high conversion efficiency is also important in which the pumping light absorbed in the active element is converted into the light to be output. When the active element is excited to cause stimulated emission, quantum efficiency is excellent as the wavelength of the pumping light to excite the active element is closer to the wavelength of the light to be output, so that stimulated emission can be efficiently caused. In the fiber laser apparatus, since the wavelength of the light to be output is longer than the wavelength of the pumping light, stimulated emission is more efficiently caused, and a light can be more efficiently amplified when the wavelength $\lambda 2$ of the second pumping light is longer than the wavelength $\lambda 1$ of the first pumping light.

Therefore, as depicted in FIG. 3, more preferably, the wavelength $\lambda 2$ of the second pumping light is longer than the wavelength $\lambda 1$ of the first pumping light, and the second pumping light is absorbed in the active element more than the first pumping light is.

As described above, in accordance with the fiber laser apparatus 1 according to this embodiment, in the optical fiber amplifier 2, the first pumping light output from the first pumping source 10 enters the one end 31 of the amplification optical fiber 30 through the first optical filter 15, the second pumping light output from the second pumping source 20 enters the other end 32 of the amplification optical fiber 30 through the second optical filter 25, and then the first pumping light and the second pumping light excite the active element. As described above, since the amplification optical fiber 30 is excited from both sides of the one end 31 side and the other end 32 side, it is possible to amplify the resonant light that is the light to be amplified at a high amplification factor in the amplification optical fiber 30.

Moreover, also in the case where a part of the first pumping light that enters the one end 31 of the amplification optical fiber 30 goes out from the other end 32 of the amplification optical fiber 30, the first pumping light that goes out from the amplification optical fiber 30 is reflected off the second optical filter 25 coupled to the other end 32 of the amplification optical fiber 30, and again enters the amplification optical fiber 30. Similarly, also in the case where a part of the second pumping light that enters the other end 32 of the amplification optical fiber 30 goes out from the one end 31 of the amplification optical fiber 30, the first pumping light that goes out from the amplification optical fiber 30 is reflected off the first optical filter 15 coupled to the one end of the amplification optical fiber, and again enters the amplification optical fiber 30. As described above, the first pumping light and the second pumping light that again enter the amplification optical fiber 30 further excite the active element, and the first pumping light and the second pumping light are both efficiently absorbed in the active element. Therefore, the active element is efficiently excited by the first pumping light and the second pumping light, and the amplification optical fiber 30 can efficiently amplify a resonating light.

As described above, in the fiber laser apparatus 1 according to this embodiment, the first pumping light and the second pumping light have wavelengths different from each other in the optical fiber amplifier 2, and the first optical filter 15 that transmits the first pumping light but reflects the second pumping light and the second optical filter 25 that transmits the second pumping light but reflects the first pumping light are included. Thus, bidirectional pumping is enabled, and the pumping lights can be efficiently used by the reflection of the pumping lights. Therefore, it is possible to efficiently amplify a resonant light at a high amplification factor.

It is noted that since the reliability of the pumping source is sometimes degraded by a slight temperature increase, there is a demand to prevent a temperature increase as much as possible. Therefore, in accordance with the optical fiber amplifier 2 according to the present invention, also in the case where the first pumping light goes out from the other end 32 of the amplification optical fiber 30, the first pumping light that goes out from the amplification optical fiber 30 is reflected off the second optical filter 25 as described above. Thus, the first pumping light is prevented from entering the second pumping source, and a temperature increase in the second pumping source 20 caused by the first pumping light is prevented. Similarly, also in the case where the second pumping light goes out from the one end 31 of the amplification optical fiber 30, the second pumping light that goes out from the amplification optical fiber 30 is reflected off the first optical filter 15 as described above. Thus, the second pumping light is prevented from entering the first pumping source, and a temperature increase in the first pumping source 10 caused by the second pumping light is prevented. Therefore, the optical fiber amplifier 2 and the fiber laser apparatus 1 can be provided with an excellent reliability, although the optical fiber amplifier amplifies a light at a high amplification factor by bidirectional pumping.

Moreover, in the fiber laser apparatus 1 according to this embodiment, the first pumping light propagation fiber 13a is directly coupled to the cladding 36 at the one end 31 of the amplification optical fiber 30, and the first pumping light directly enters the amplification optical fiber from the first pumping light propagation fiber 13a. Thus, it is possible to reduce the attenuation of the first pumping light caused by the coupling portion or the like, and it is possible to more efficiently amplify the light to be amplified. Similarly, in the fiber laser apparatus 1 according to this embodiment, the second pumping light propagation fiber 23a is directly coupled to the cladding 36 at the other end 32 of the amplification optical fiber 30, and the second pumping light directly enters the amplification optical fiber from the second pumping light propagation fiber 23a. Thus, it is possible to reduce the attenuation of the second pumping light caused by the coupling portion or the like, and it is possible to more efficiently amplify the light to be amplified.

Second Embodiment

Figure 4:
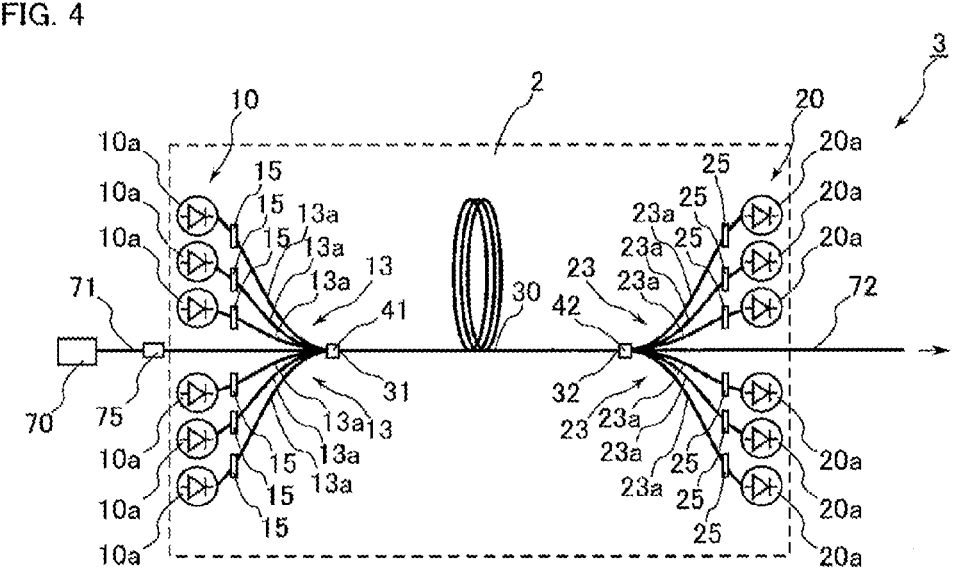
FIG. 4 is a diagram of a fiber laser apparatus according to a second embodiment of the present invention.

Next, a second embodiment of the present invention will be described in detail with reference to FIG. 4. It is noted that components the same as or equivalent to the components of the first embodiment are designated the same reference numerals and signs, and the overlapping description is omitted unless otherwise specified. FIG. 4 is a diagram of a fiber laser apparatus according to the second embodiment of the present invention.

As depicted in FIG. 4, a fiber, laser apparatus 3 according to this embodiment has a configuration mainly including an optical fiber amplifier 2, a seed light source 70 that outputs a seed light, a seed light port 71 having one end thereof coupled to the seed light source 70 and the other end thereof coupled to a core 35 of an amplification optical fiber 30 at one end 31 of the amplification optical fiber 30, and an output port 72 coupled to the core 35 of the amplification optical fiber 30 at an other end 32 side of the amplification optical fiber 30.

For example, the seed light source 70 is configured of a laser light source formed of a laser diode, or a Fabry-Perot or fiber ring fiber laser apparatus. A seed light output from the seed light source 70 is not limited more particularly. However, in the case where Yb, for example, is used for the active element as described above, the seed light is a laser light at a wavelength of 1,080 nm, for example.

The seed light port 71 is configured of an optical fiber such as a single mode fiber, for example, and the end surface of the core of the seed light port 71 is connected to the core 35 of the amplification optical fiber 30, and the seed light port 71 is coupled to the amplification optical fiber 30 at a first optical coupler 41. It is noted that a light emitter 75 that emits unnecessary light to the outside is provided in the midway of the seed light port 71.

Moreover, the output port 72 is configured of an optical fiber such as a single mode fiber, for example, and the end surface of the core of the output port 72 is connected to the core 35 of the amplification optical fiber 30 at the second optical coupler 42, and the output port 72 is coupled to the amplification optical fiber 30.

In this fiber laser apparatus 3, as similar to the optical fiber amplifier 2 in the first embodiment, a first pumping light and a second pumping light are output from a first pumping source 10 and a second pumping source 20, respectively, and the first pumping light and the second pumping light cause an active element of the amplification optical fiber 30 in the excited state. A seed light that is the light to be amplified is then output from the seed light source 70, and the seed light propagates through the seed light port 71, enters the core 35 of the amplification optical fiber 30 from the one end 31, and propagates through the core 35. The seed light propagating through the core 35 is amplified by the stimulated emission of the active element, and goes out as an output light from the other end 32 of the amplification optical fiber 30. The output light then enters the output port 72, and goes out from the end portion of the output port 72. It is noted that a tiny second pumping light that enters the seed light port 71 is emitted to the outside at the light emitter 75.

In accordance with the fiber laser apparatus according to this embodiment, it is possible to efficiently amplify the input seed light at a high amplification factor and output the input seed light. Moreover, also in the fiber laser apparatus according to this embodiment, it is possible to provide an excellent reliability, although the optical fiber amplifier amplifies a light, at a high amplification factor by bidirectional pumping.

Third Embodiment

Figure 5:
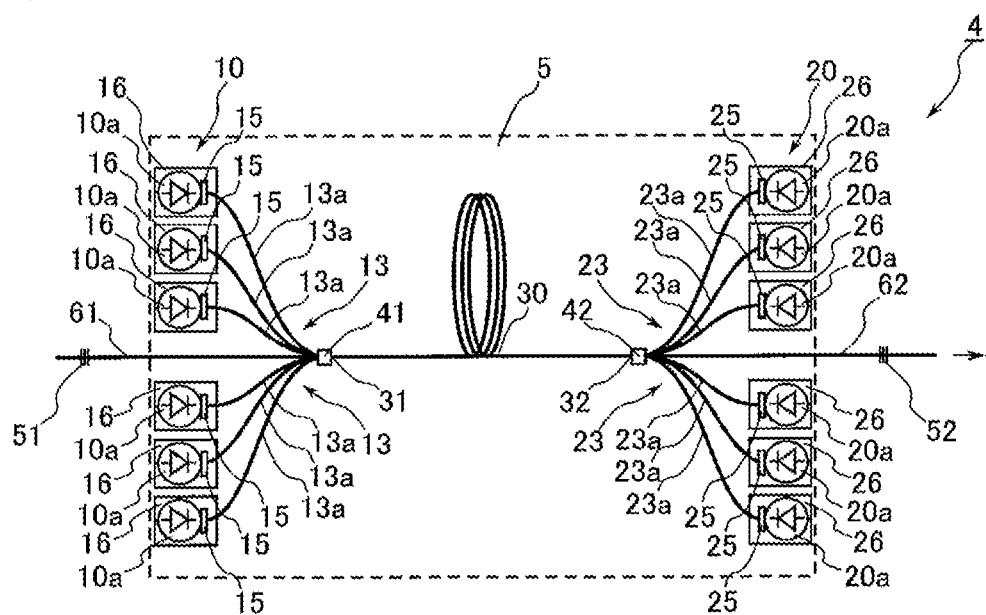
FIG. 5 is a diagram of a fiber laser apparatus according to a third embodiment of the present invention.

Next, a third embodiment according to the present invention will be described in detail with reference to FIGS. 5 and 6. It is noted that components the same as or equivalent to the components of the first embodiment are designated the same reference numerals and signs, and the overlapping description is omitted unless otherwise specified. FIG. 5 is a diagram of a fiber laser apparatus according to the third embodiment of the present invention.

A fiber laser apparatus 4 according to this embodiment is different from the fiber laser apparatus 1 according to the first embodiment in that an optical fiber amplifier 5 is used instead of the optical fiber amplifier 2 according to the first embodiment. The optical fiber amplifier 5 according to this embodiment is different from the optical fiber amplifier 2 according to the first embodiment in that a first optical filter 15 is disposed between a laser diode 10a and a first pumping light propagation fiber 13a and a second optical filter 25 is disposed between a laser diode 20a and a second pumping light propagation fiber 23a.

Figure 6:
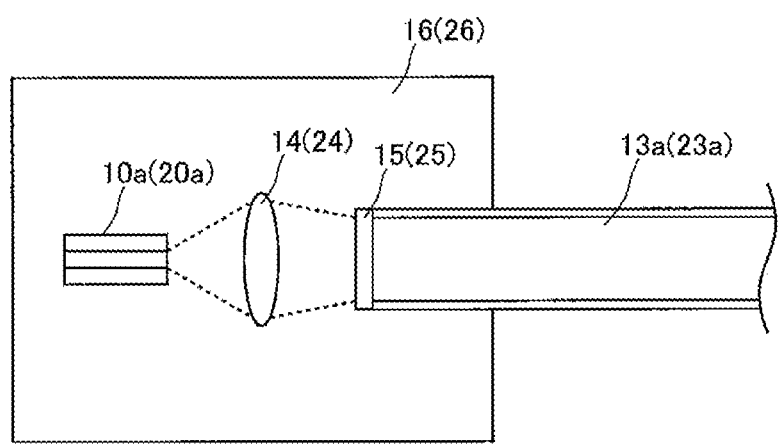
FIG. 6 is a diagram of the manner of a laser module in FIG. 5.

FIG. 6 is a diagram of a single laser module forming a pumping source 10 depicted in FIG. 5. More specifically, FIG. 6 is a detailed diagram of the manners of the laser diode (a diode chip) 10a, and the first optical filter 15, and the first pumping light propagation fiber 13a. It is noted that the manner of a single laser module forming the pumping source 20 is denoted in brackets in FIG. 6.

As depicted in FIG. 6, the first optical filter 15 in this embodiment is disposed on the end surface on the laser diode 10a side of the first pumping light, propagation fiber 13a. Then, a lens 14 is provided between the laser diode 10a and the first optical filter 15. As described above, the laser diode 10a is coupled to the first pumping light propagation fiber 13a through the lens 14 and the first optical filter 15. Then, a laser module 16 is formed including the laser diode 10a, the lens 14, and the first optical filter 15.

Moreover, as denoted in the brackets in FIG. 6, the second optical filter 25 is disposed on the end surface on the laser diode (a diode chip) 20a side of the second pumping light propagation fiber 23a. Then, a lens 24 is provided between the laser diode 20a and the first optical filter 25. As described above, the laser diode 20a is coupled to the second pumping light propagation fiber 23a through the lens 24 and the second optical filter 25. Then, a laser module 26 is formed including the laser diode 20a, the lens 24, and the second optical filter 25.

In this optical fiber amplifier 5, a pumping light output from the laser diode 10a is collected at the lens 14 as denoted by the broken lines in FIG. 6, passes through the first optical filter 15, and enters the first pumping light propagation fiber 13a. Similarly, a pumping light output from the laser diode 20a is collected at the lens 24 in the laser module 26, passes through the second optical filter 25, and enters the second pumping light propagation fiber 23a.

Then, the pumping light enters the amplification optical fiber 30 from the first pumping light propagation fiber 13a, and the pumping light is not absorbed in the active element at the amplification optical fiber 30, goes out from the amplification optical fiber 30, and then enters the second pumping light, propagation fiber 23a. The pumping light is reflected off the second optical filter 25 on the end surface of the second pumping light propagation fiber 23a, and again enters the amplification optical fiber 30. Similarly, the pumping light enters the amplification optical fiber 30 from the second pumping light propagation fiber 23a, and the pumping light is not absorbed in the active element at the amplification optical fiber 30, goes out from the amplification optical fiber 30, and enters the first pumping light propagation fiber 13a. The pumping light is reflected off the first optical filter 15 on the end surface of the first pumping light propagation fiber 13a, and again enters the amplification optical fiber 30.

In accordance with the optical fiber amplifier 5 according to this embodiment, since the first and second optical filters 15 and 25 are provided in the laser modules 16 and 26, respectively, the relative positions between the laser diodes 10a and 20a and the first and second optical filters 15 and 25 can be fixed, and the displacement of the optical axis caused by vibrations or the like can be reduced. Particularly in this embodiment, since the end portions of the first and second pumping light propagation fibers 13a and 23a are disposed in the laser modules 16 and 26, respectively, the relative positions between the laser diodes 10a and 20a, the optical systems formed of the first and second optical filters 15 and 25, and the first and second pumping light propagation fibers 13a and 23a can also be fixed, and the displacement of the optical axis caused by vibrations or the like can be further reduced. Moreover, since the laser module generally includes a metal casing, the laser diodes 10a and 20a, the first and second optical filters 15 and 25, and the end portions of the first and second pumping light propagation fibers 13a and 23a are fixed to this casing. Thus, it is possible to further reduce optical displacement caused by vibrations or the like as described above, and it is possible to provide a higher durability.

Figure 7:
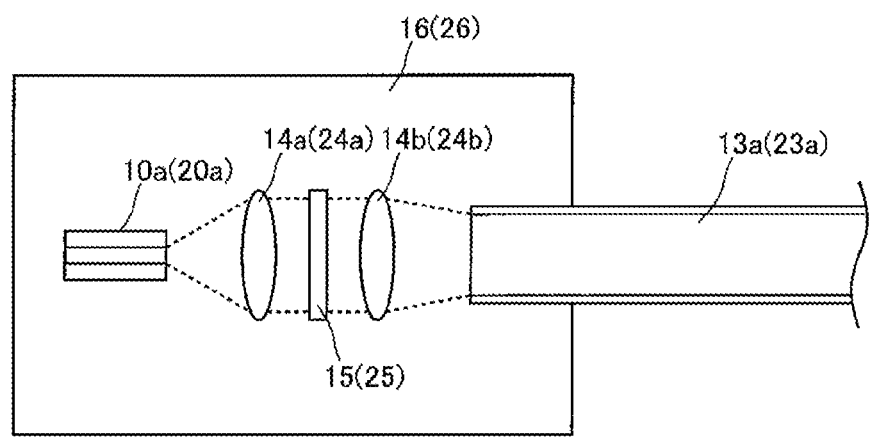
FIG. 7 is a diagram of an exemplary modification of the laser module in FIG. 6.

It is noted that in this embodiment, the first optical filter 15 is not necessarily formed on the end surface of the first pumping light propagation fiber 13a. Similarly, the second optical filter 25 is not necessarily formed on the end surface of the second pumping light propagation fiber 23a. FIG. 7 is a diagram of an exemplary modification of the laser module 16 in FIG. 6. It is noted that an exemplary modification of the laser module 26 in FIG. 6 is denoted in brackets in FIG. 7.

For example, as depicted in FIG. 7, such a configuration may be possible in which in the laser module 16, the first optical filter 15 is disposed between the laser diode 10a and the first pumping light propagation fiber 13a, the lens 14a is provided between the laser diode 10a and the first optical filter 15, and a lens 14b is provided between the first optical filter 15 and the first pumping light propagation fiber 13a. Moreover, as denoted in the brackets in FIG. 7, such a configuration may be possible in which in the laser module 26, the second optical filter 25 is disposed between the laser diode 20a and the second pumping light propagation fiber 23a, the lens 24a is provided between the laser diode 20a and the second optical filter 25, and a lens 24b is provided between the second optical filter 25 and the second pumping light propagation fiber 23a.

In this case, as denoted by the broken lines in FIG. 7, a pumping light output from the laser diode 10a is formed in a collimated light at the lens 14a, and passes through the first optical filter 15. The pumping light is collected at the lens 14b, and enters the first pumping light propagation fiber 13a. Similarly, a pumping light output from the laser diode 20a in the laser diode 20a is formed in a collimated light at the lens 24a between the laser diode 20a and the second optical filter 25, and passes through the second optical filter 25. The pumping light is collected at the lens 24b between the second optical filter 25 and the second pumping light propagation fiber 23a, and enters the second pumping light propagation fiber 23a.

Then, in the case where the pumping light enters the amplification optical fiber 30 from the first pumping light propagation fiber 13a and the pumping light is not absorbed in the active element at the amplification optical fiber 30, enters the second pumping light propagation fiber 23a, and goes out the second pumping light propagation fiber 23a, the pumping light is reflected off the second optical filter 25 through the lens 24b between the second optical filter 25 and the second pumping light propagation fiber 23a, enters the second pumping light propagation fiber 23a again through the lens 24b, and enters the amplification optical fiber 30. Similarly, in the case where the pumping light enters the amplification optical fiber 30 from the second pumping light propagation fiber 23a and the pumping light is not absorbed in the active element at the amplification optical fiber 30, enters the first pumping light propagation fiber 13a, and goes out the first pumping light propagation fiber 13a, the pumping light is reflected off the first optical filter 15 through the lens 14b, enters the first pumping light propagation fiber 13a again through the lens 14b, and enters the amplification optical fiber 30.

Fourth Embodiment

Figure 8:
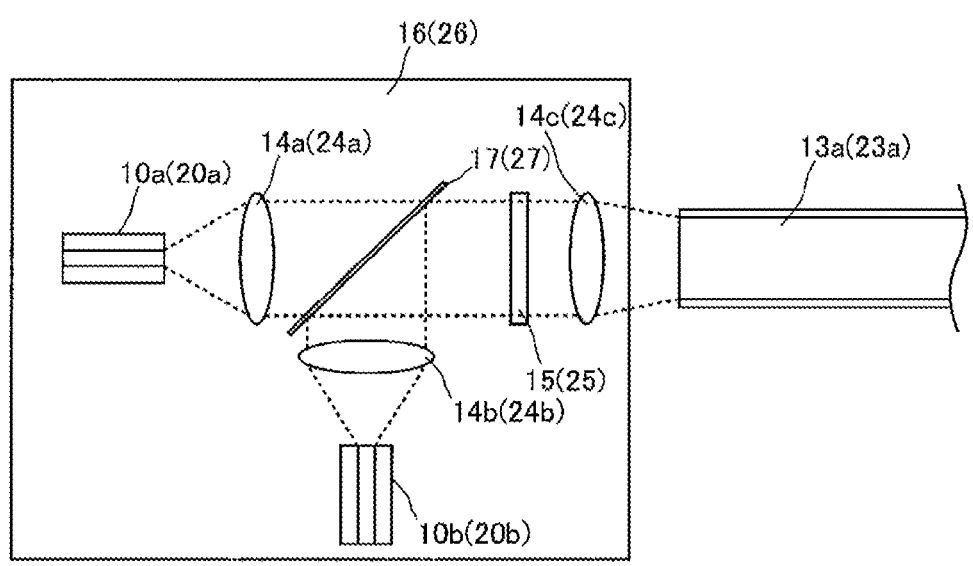
FIG. 8 is a diagram of the manners of an optical fiber amplifier and a pumping source for use in a fiber laser apparatus according to a fourth embodiment of the present invention.

Next, a fourth embodiment of the present invention will be described in detail with reference to FIG. 8. It is rioted that components the same as or equivalent to the components of the third embodiment are designated the same reference numerals and signs, and the overlapping description is omitted unless otherwise specified. FIG. 8 is a diagram of the manners of an optical fiber amplifier and a pumping source 10 for use in a fiber laser apparatus according to the fourth embodiment of the present invention. More specifically, FIG. 8 is a detailed diagram of the manner of a single laser module forming the pumping source 10. It is noted that in FIG. 8, the manner of a single laser module forming a pumping source 20 is denoted in brackets.

In this embodiment, the configurations of laser modules 16 and 26 in first and second pumping sources 10 and 20, respectively, are different from the configurations of the optical fiber amplifier 5 and the fiber laser apparatus 4 according to the third embodiment, and the other configurations are the same as the configurations of the optical fiber amplifier 5 and the fiber laser apparatus 4 according to the third embodiment.

As depicted in FIG. 8, in an optical fiber amplifier and a fiber laser apparatus according to this embodiment, a pair of laser diodes 10a and 10b are disposed in a laser module 16 to which a first pumping light propagation fiber 13a is connected. Then, the laser diode 10a that is one of the pair is disposed so as to output a pumping light to the first pumping light propagation fiber 13a, and the laser diode 10b that is the other of the pair is disposed so as to output a pumping light in the direction orthogonal to the pumping light output from the laser diode lea that is one of the pair. The laser diodes 10a and 10b output the pumping lights that the polarization directions are orthogonal to each other. Moreover, a polarization combiner filter 17 tilted at an angle of about 45 degrees to the pumping lights output from the laser diodes 10a and 10b is disposed at a location where the pumping light output from the laser diode 10a that is one of the pair intersects the pumping light output from the laser diode 10b that is the other of the pair. The polarization combiner filter 17 is configured to transmit the pumping light output from the laser diode 10a that is one of the pair and reflect the pumping light output from the laser diode 10b that is the other of the pair. Furthermore, a lens 14a is disposed between the polarization combiner filter 17 and the laser diode 10a that is one of the pair, a lens 14b is disposed between the polarization combiner filter 17 and the laser diode 10b that is the other of the pair, and a lens 14c is disposed between the polarization combiner filter 17 and the first pumping, propagation fiber 13a. In addition, a first optical filter 15 is disposed between the polarization combiner filter 17 and the lens 14c. It is noted that the wavelengths of the pumping lights output from the laser diodes 10a and 10b are equal to each other; the wavelengths are the wavelength λ1 of the pumping light output from the laser diode 10a in the first embodiment, for example.

Similarly, as denoted in the brackets in FIG. 8, a pair of laser diodes 20a and 20b is disposed in the laser module 26 to which a second pumping light propagation fibers 23a is connected. Then, the laser diode 20a that is one of the pair is disposed so as to output a pumping light to the second pumping light propagation fiber 23a, and the laser diode 20b that is the other of the pair is disposed so as to output a pumping light in the direction orthogonal to the pumping light output from the laser diode 20a that is one of the pair. The laser diodes 20a and 20b output the pumping lights that the polarization directions are orthogonal to each other. Moreover, a polarization combiner filter 27 tilted at an angle of about 45 degrees to the pumping lights output from the laser diodes 20a and 20b is disposed at a location where the pumping light output from the laser diode 20a that is one of the pair intersects the pumping light output from the laser diode 20b that is the other of the pair. The polarization combiner filter 27 is configured to transmit the pumping light output from the laser diode 20a that is one of the pair and reflect the pumping light output from the laser diode 20b that is the other of the pair. Furthermore, a lens 24a is disposed between the polarization combiner filter 27 and the laser diode 20a that is one of the pair, a lens 24b is disposed between the polarization combiner filter 27 and the laser diode 20b that is the other of the pair, and a lens 24c is disposed between the polarization combiner filter 27 and the second pumping light propagation fiber 23a. In addition, a second optical filter 25 is disposed between the polarization combiner filter 27 and the lens 24c. It is noted that the wavelengths of the pumping lights output from the laser diodes 20a and 20b are equal to each other; the wavelengths are the wavelength λ2 of the pumping light output from the laser diode 20a in the second embodiment, for example.

In the laser module 16 in this configuration, the pumping light output from the laser diode 10a is formed in a collimated light at the lens 14a, and passes through the polarization combiner filter 17. The pumping light output from the laser diode 10b is formed in a collimated light at the lens 14b, and reflected off the polarization combiner filter 17 at a right angle. As described above, the pumping light output from the laser diode 10a is combined with the pumping light output from the laser diode 10b. Then, the pumping lights output from the laser diode 10a and the laser diode 10b and combined with each other pass through the first optical filter 15, and enter the lens 14c and the first pumping light propagation fiber 13a. Similarly, in the laser module 26, the pumping light output from the laser diode 20a is formed in a collimated light at the lens 24a, and passes through the polarization combiner filter 27. The pumping light output from the laser diode 20b is formed in a collimated light at the lens 24b, and reflected off the polarization combiner filter 27 at a right angle. As described above, the pumping light output from the laser diode 20a is combined with the pumping light output from the laser diode 20b. Then, the pumping lights output from the laser diode 20a and the laser diode 20b and combined with each other pass through the second optical filter 25, and enter the lens 24c and the second pumping light propagation fiber 23a.

Then, the pumping light enters the amplification optical fiber 30 from the first pumping light propagation fiber 13a, and the pumping light is not absorbed in the active element in the amplification optical fiber 30, goes out from the amplification optical fiber 30, and enters the second pumping light propagation fiber 23a. The pumping light is reflected off the second optical filter 25 in the laser module 26, and again enters the amplification optical fiber 30. Similarly, the pumping light enters the amplification optical fiber 30 from the second pumping light propagation fiber 23a, and the pumping light is not absorbed in the active element in the amplification optical fiber 30, goes out from the amplification optical fiber 30, and enters the first pumping light propagation fiber 13a. The pumping light is reflected off the first optical filter 15 in the laser module 16, and again enters the amplification optical fiber 30.

In accordance with the optical fiber amplifier 5 according to this embodiment, the pair of the laser diodes 10a and 10b (20a and 20b) is provided in the laser module 16 (26), and the lights output from the laser diodes 10a and 10b (20a and 20b) enter the first pumping light propagation fiber 13a (the second pumping light propagation fiber 23a). Thus, it is possible to input pump a light of higher intensity to the amplification optical fiber 30.

It is noted that in this embodiment, the following exemplary modification can be formed. Namely, such a configuration may be possible in which the wavelengths of the pumping lights output from the pair of the laser diodes 10a and 10b in the laser module 16 are slightly different from each other, a wavelength combiner filter is provided instead of the polarization combiner filter 17, the wavelengths of the pumping lights output from the pair of the laser diodes 20a and 20b in the laser module 26 are slightly different from each other, and a wavelength combiner filter is provided instead of the polarization combiner filter 27. In this case, the wavelengths of the pumping lights output from the laser diodes 10a and 10b are at wavelengths of 915 nm and 920 nm, respectively, for example, and the wavelength λ1 is a concept including wavelengths of 915 nm and 920 nm. Similarly, the wavelengths of the pumping lights output from the laser diodes 20a and 20b are at wavelengths of 975 nm and 980 nm, respectively, for example, and the wavelength λ2 is a concept including wavelengths of 975 nm and 980 nm. Therefore, the first optical filter 15 is configured in which the first optical filter 15 transmits lights at wavelengths of 910 nm to 925 nm, for example, but reflects lights at wavelengths of 970 to 985 nm. The second optical filter 25 is configured to transmit lights at wavelengths of 970 to 985 nm, for example, but reflect lights at wavelengths of 910 to 925 nm.

In this exemplary modification, such a configuration is unnecessary in which the polarization directions of the pair of the laser diodes 10a and 10b (20a and 20b) are different from each other.

An efficient wavelength at which an active element doped in the amplification optical fiber 30 is invertedly populated is sometimes changed depending on an environment such as temperature. However, according to this exemplary modification, since the wavelengths of the pumping lights output from the pair of the laser diodes 10a and 10b (20a and 20b) in the laser module 16 (26) are slightly different from each other, it is possible to suppress a change in the efficiency in which the active element is invertedly populated by the pumping lights caused by an environment such as temperature.

Figure 9:
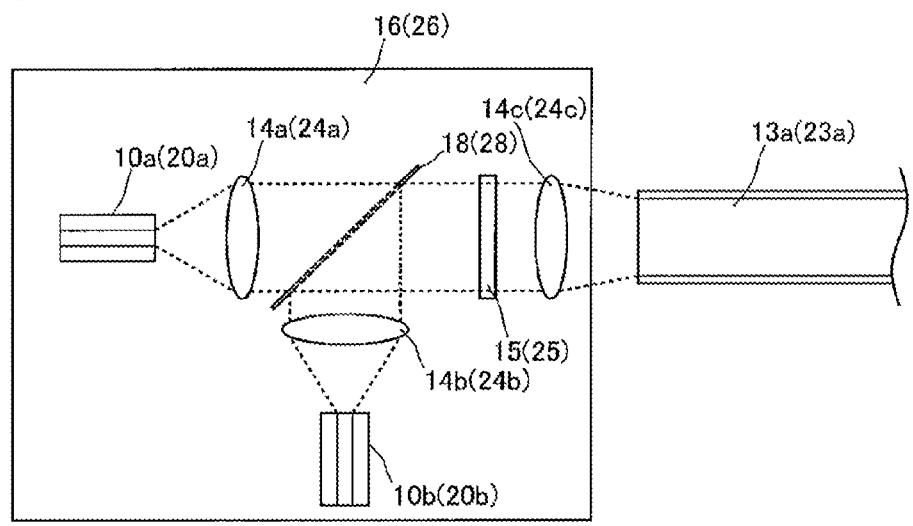
FIG. 9 is a diagram of an exemplary modification of a laser module in 8.

Moreover, in this embodiment, the following exemplary modification can be further formed. FIG. 9 is a diagram of an exemplary modification of the laser module 16 depicted in FIG. 8. It is noted that components the same as or equivalent to the components of the fourth embodiment are designated the same reference numerals and signs, and the overlapping description is omitted unless otherwise specified. Furthermore, in FIG. 9, the manner of a single laser module forming the pumping source 20 is denoted in brackets.

In FIG. 9, the height of the laser diode 10a that is one of the pair is different from the height of the laser diode 10b that is the other of the pair in the laser module 16, and the lenses 14a and 14b are disposed at locations matched with the laser diodes 10a and 10b, respectively. Then, a mirror 18 is disposed at a location where only a pumping light output from the laser diode 10b is applied. The mirror 18 is configured to reflect the pumping light to the first pumping light propagation fiber 13a. Therefore, the pumping light output from the laser diode 10a passes through the side of the mirror 18. It is noted that in FIG. 9, a portion depicted by broken lines in the mirror 18 is a portion overlapped with the pumping light output from the laser diode 10a.

Similarly, the height of the laser diode 20a that is one of the pair is different from the height of the laser diode 20b that is the other of the pair in the laser module 26, and the lenses 24a and 24b are disposed at locations matched with the laser diodes 20a and 20b, respectively. Then, a mirror 28 is disposed at a location where only a pumping light output from the laser diode 20b is applied. The mirror 28 is configured to reflect the pumping light to the second pumping light propagation fiber 23a. Therefore, the pumping light output from the laser diode 20a passes through the side of the mirror 28.

Figure 10:
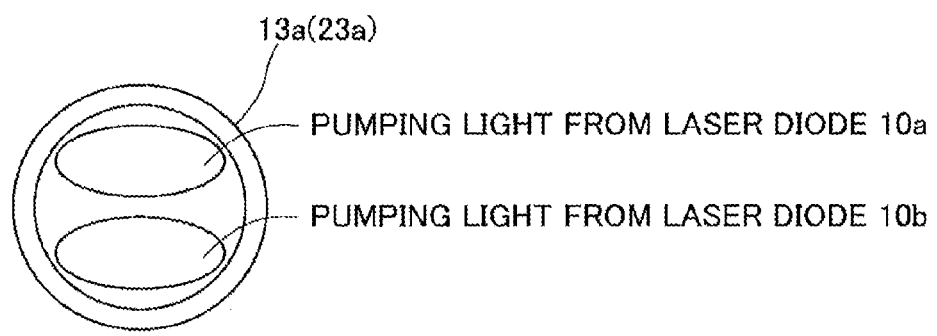
FIG. 10 is a diagram of the manner of a pumping light that enters a first pumping light propagation fiber in FIG. 9.

FIG. 10 is a diagram of the mariner of a pumping light that enters the first pumping light propagation fiber 13a. In the laser module 16, a pumping light output from the laser diode 10a is formed in a collimated light at the lens 14a, passes through the side of the mirror 18 as described above, and passes through the first optical filter 15. The pumping light is collected at the lens 14c, and enters the first pumping light propagation fiber 13a. In this entry, as depicted in FIG. 10, the pumping light output from the laser diode 10a enters a part of the core of the first pumping light propagation fiber 13a. Moreover, a pumping light output from the laser diode 10h is formed in a collimated light at the lens 14b, reflected off the mirror 18, and passes through the first optical filter 15. The pumping light is collected at the lens 14c, and enters the first pumping light propagation fiber 13a. In this entry, as depicted in FIG. 10, the pumping light output from the laser diode 10b enters another part of the core of the first pumping light propagation fiber 13a. In other words, the pumping light output from the laser diode 10a and the pumping light output from the laser diode 10b enter different locations in the core of the first pumping light propagation fiber 13a.

Similarly, in the laser module 26, a pumping light output from the laser diode 20a is formed in a collimated light at the lens 24a, passes through the side of the mirror 28 as described above, and passes through the second optical filter 25. The pumping light is collected at the lens 24c, and enters the second pumping light propagation fiber 23a. In this entry, as depicted in FIG. 10, the pumping light output from the laser diode 20a enters a part of the core of the second pumping light propagation fiber 23a. Moreover, a pumping light output from the laser diode 20b is formed in a collimated light at the lens 24b, reflected off the mirror 28, and passes through the second optical filter 25. The pumping light is collected at the lens 24c, and enters the second pumping light propagation fiber 23a. In this entry, as depicted in FIG. 10, the pumping light output from the laser diode 10b enters another part of the core of the second pumping light propagation fiber 23a. In other words, the pumping light output from the laser diode 20a and the pumping light output from the laser diode 20b enter at different locations in the core of the second pumping light propagation fiber 23a.

It is noted that in this exemplary modification, such a configuration may be possible in which the pumping lights at wavelengths the same as the wavelength λ1 are output from the pair of the laser diodes 10a and 10b and the pumping lights at wavelengths the same as the wavelength λ2 are output from the pair of the laser diodes 20a and 20b in the laser module 26. As similar to the foregoing exemplary modification, such a configuration may be possible in which the wavelengths λ1 of the pumping lights output from the pair of the laser diodes 10a and 10b are slightly different from each other and the wavelengths λ2 of the pumping lights output from the pair of the laser diodes 20a and 20b in the laser module 26 are slightly different from each other.

As described above, the optical fiber amplifier and the fiber laser apparatus using the same according to the present invention are described as the first to fourth embodiments are taken as examples. However, the present invention is not limited to these embodiments.

For example, in the foregoing embodiments, the first pumping light propagation fiber 13a and the second pumping light propagation fiber 23a are directly coupled to the cladding 36 of the amplification optical fiber 30. However, the present invention is not limited thereto. For example, such a configuration may be possible in which the optical fiber amplifier 2 further includes a first optical fiber having a first core and a first cladding, in which the end surface of the one end 31 of the amplification optical fiber 30 is connected to the end surface of one end of the first optical fiber, and the end surface of the first pumping light propagation fiber 13a is connected to the cladding of the first optical fiber at the other end of the first optical fiber. With this configuration, the first core is coupled to the core 35 of the amplification optical fiber 30, the first cladding is coupled to the cladding 36 of the amplification optical fiber 30, and the first optical filter 15 is coupled to the cladding 36 of the amplification optical fiber 30 through the first pumping light propagation fiber 13a and the first cladding. Therefore, the first pumping light enters the cladding 36 of the amplification optical fiber 30 through the first cladding of the first optical fiber. For the first optical fiber, a double cladded fiber can be used.

Moreover, such a configuration may be possible in which the optical fiber amplifier 2 further includes a second optical fiber having a second core and a second cladding, in which the end surface of the other end 32 of the amplification optical fiber 30 is connected to the end surface of one end of the second optical fiber and the end surface of the second pumping light propagation fiber 23a is connected to the cladding of the second optical fiber at the other end of the second optical fiber. With this configuration, the second core is coupled to the core 35 of the amplification optical fiber 30, the second cladding is coupled to the cladding 36 of the amplification optical fiber 30, and the second optical filter 25 is coupled to the cladding 36 of the amplification optical fiber 30 through the second pumping light propagation fiber 23a and the second cladding. Therefore, the second pumping light enters the cladding 36 of the amplification optical fiber 30 through the second cladding of the second optical fiber. For the second optical fiber, a double cladded fiber can be used as similar to the first optical fiber.

Then, as described above, in the case where the first optical fiber and the second optical fiber are connected to the amplification optical fiber 30, it is sufficient that the resonance ports 61 and 62 in the first embodiment are connected to the core of the first optical fiber and the core of the second optical fiber, respectively. Moreover, in the case where the first optical fiber and the second optical fiber are connected to the amplification optical fiber 30 as described above, such a configuration may be possible in which the first FBG 51 is provided at the core of the first optical fiber and the second FBG 52 is provided at the core of the second optical fiber. As described above, in the case where the first FBG 51 and the second FBG 52 are provided on the first optical fiber and the second optical fiber, respectively, the first FBG 51 and the second FBG 52 are located closer to the amplification optical fiber 30 side than the first optical coupler 41 and the second optical coupler 42 are located. Thus, it is possible to prevent the attenuation of the resonant light caused by the first optical coupler 41 and the second optical coupler 42, and it is possible to highly efficiently amplify a light.

Furthermore, the optical fiber amplifier 2 is configured of a so-called cladding pumping configuration in which a pumping light propagates through the cladding 36 of the amplification optical fiber 30. However, the configuration is not necessarily cladding pumping configuration. A core pumping configuration may be possible in which a pumping light propagates through the core of the amplification optical fiber. In this case, the amplification optical fiber may be configured of a single clad finer, for example. Then, such a configuration may be possible in which the first pumping port 13 is formed of a single first pumping light propagation fiber 13a, the second pumping port 23 is also formed of a single second pumping light propagation fiber 23a, the first optical coupler 41 and the second optical coupler 42 are formed of a WDM coupler, and the first pumping port 13 and the second pumping port 23 are coupled to the core of the amplification optical fiber.

In addition, the first FBG 51 and the second FBG 52 are used for the first reflecting mirror and the second reflecting mirror. However, for the first reflecting mirror and the second reflecting mirror, another unit that reflects a light at a specific wavelength may be used such as a dielectric multilayer optical filter.

Moreover, for the first optical filter 15 and the second optical filter 25, the dielectric multilayer optical filter is used. However, it is sufficient that the first optical filter 15 transmits a light at a wavelength the same as the wavelength of the first pumping light and reflects a light at a wavelength the same as the wavelength of the second pumping light, and the second optical filter 25 transmits a light at a wavelength the same as the wavelength of the second pumping light and reflects a light at a wavelength the same as the wavelength of the first pumping light. Therefore, the first optical filter 15 and the second optical filter 25 are not limited to the dielectric multilayer optical filter.

Furthermore, the first optical filter 15 and the second optical filter 25 are disposed in the midway of the first pumping light propagation fiber 13a and the second pumping light propagation fiber 23a, respectively. However, the first optical filter 15 and the second optical filter 25 may be disposed at the end portions of the first pumping light propagation fiber 13a and the second pumping light propagation fiber 23a on the amplification optical fiber 30 side. In addition, alternatively, the first optical filter 15 and the second optical filter 25 may be disposed between the amplification optical fiber 30 and the first pumping light propagation fiber 13a, and between the amplification optical fiber 30 and the second pumping light propagation fiber 23a. In this case, it is sufficient that the first pumping light propagation fiber 13a and the second pumping light propagation fiber 23a are coupled to the amplification optical fiber 30 through the first optical filter 15 and the second optical filter 25, respectively.

EXAMPLES

In the following, the content of the present invention will be described more in detail with reference to examples and comparative examples. However, the present invention will not be limited thereto.

Example 1

A fiber laser apparatus similar to that of the first embodiment was prepared.

In an optical fiber amplifier, a double cladded fiber having a length of 40 m was used for the amplification optical fiber, in which the diameter of the core was 15 µm and the diameter of the cladding was 400 µm. Moreover, silica doped with Yb and Al was used for the core material, pure silica with no dopant was used for the cladding material, and an ultraviolet cure resin was used for the materials of the external cladding and the protection cover layer, in which the wavelength when a pumping light entered the cladding was a wavelength of 915 nm, the absorption rate of a pumping light was 0.3 dB/m, and the absorption rate of a pumping light at a wavelength of 975 nm was 1.1 dB/m.

Furthermore, a first pumping source was formed of six semiconductor lasers to output a pumping light at a wavelength of 915 nm, and a second pumping source was formed of six semiconductor lasers to output a pumping light at a wavelength of 975 nm. Then, a first pumping light propagation fiber was formed of multimode fibers in the same number of the semiconductor lasers of the first pumping source, in which one ends of the first pumping light propagation fibers were individually coupled to the semiconductor lasers and the end surfaces of the other ends were connected to the cladding of the amplification optical fiber at a first optical coupler.

Moreover, a dielectric multilayer optical filter having $SiO_2$ and $Ta_2O_5$ alternately stacked on each other was individually provided as a first optical filter in the midway of the first pumping light propagation fibers, in which the dielectric multilayer optical filter transmitted a light at a wavelength of 915 nm but reflected a light at a wavelength of 975 nm. Furthermore, a second pumping light propagation fiber was formed of multimode fibers in the same number of the semiconductor lasers of the second pumping source, in which one ends of the second pumping light propagation fibers were individually coupled to the semiconductor lasers and the end surfaces of the other ends were connected to the cladding of the amplification optical fiber at a second optical coupler. Moreover, a dielectric multilayer optical filter having $SiO_2$ and $Ta_2O_5$ alternately stacked on each other was provided as a second optical filter in the midway of the second pumping light propagation fibers, in which the dielectric multilayer optical filter transmitted a light at a wavelength of 975 nm but reflected a light at a wavelength of 915 nm.

Furthermore, a single mode fiber was used for a first resonance port and a second resonance port connected to the optical fiber amplifier, in which the end surface of the core of the first resonance port was connected to the end surface of the core of the amplification optical fiber at the first optical coupler and the end sir face of the core of the second resonance port was connected to the end surface of the core of the amplification optical fiber at the second optical coupler. In addition, the reflection wavelengths of a first FBG and a second FBG were 1070 nm, the reflectance of the first FBG was 100%, and the reflectance of the second FBG was 4%.

Comparative Example 1

The configuration of a comparative example 1 was similar to the configuration of the example 1 except that no dielectric multilayer optical filter was provided on a first pumping port and a second pumping port.

Next, in the example 1 and the comparative example 1, a pumping light of 60 W was output from the first pumping source and the second pumping source. In the example 1, an output light of 360 W was obtained. On the other hand, in the comparative example 1, the obtained output light was 330 W. Moreover, when the temperature of the first pumping source and the temperature of the second pumping source in this output were measured, in the example 1, the first pumping source was at a temperature of 43° C., and the second pumping source was at a temperature of 46° C. On the contrary, in the comparative example 1, the first pumping source was at a temperature of 44° C., and the second pumping source was at a temperature of 49° C.

Example 2

A fiber laser apparatus similar to that of the second embodiment was prepared. For an optical fiber amplifier, the optical fiber amplifier similar to that of the first embodiment was used. Then, for a seed light source, a laser oscillator that outputs a seed light at a wavelength of 1,080 nm was used. Moreover, a single mode fiber was used for a seed light port, in which one end was connected to the seed light source and the other end was connected to the end surface of the core of an amplification optical fiber at a first optical coupler. Furthermore, a single mode fiber was used for an output port, in which one end was connected to the end surface of the core of the amplification optical fiber at a second optical coupler.

Comparative Example 2

The configuration of a comparative example 2 was similar to the configuration of the example 2 except that no dielectric multilayer optical filter was provided on a first pumping port and a second pumping port.

Next, in the example 2 and the comparative example 2, a seed light of 10 W was output from a seed light source, and a pumping light of 60 W was output from the first pumping source and the second pumping source. In the second embodiment, an output light of 390 W was obtained. On the other hand, in the comparative example 2, the obtained output light was 350 W. Moreover, when the temperature of the first pumping source and the temperature of the second pumping source in this output were measured, in the second embodiment, the first pumping source was at a temperature of 43° C., and the second pumping source was at a temperature of 46° C. On the contrary, in the comparative example 2, the first pumping source was at a temperature of 44° C., and the second pumping source was at temperature of 50° C.

As described above, in the examples and the comparative examples, bidirectional pumping was performed, and the pumping lights of the same power were used. However, in the examples 1 and 2, the output lights were stronger than in the comparative Examples 1 and 2. Thus, it was revealed that a light can be efficiently amplified in the examples 1 and 2.

Moreover, in the comparative Examples 1 and 2, the temperatures of the pumping sources became higher than the temperatures in the examples 1 and 2, and it can be considered that the first pumping light enters the second pumping source from the amplification optical fiber and the second pumping light enters the first pumping source from the amplification optical fiber. Therefore, it was revealed that the reliability of the examples 1 and 2 was higher than in the comparative Examples 1 and 2.

INDUSTRIAL APPLICABILITY

According to the present invention, it is possible to provide an optical fiber amplifier that is a bidirectional pumping type and can efficiently amplify a light and a fiber laser apparatus using the same.

DESCRIPTION OF REFERENCE NUMERALS 1, 3, 4 . . . fiber laser apparatus
2, 5 . . . optical, fiber amplifier
10 . . . first pumping source
10a, 10b . . . laser diode (light source)
13 . . . first pumping port
13a . . . first pumping light propagation fiber
14, 14a, 14b, 14c . . . lens
15 . . . first optical filter
16 . . . laser module
17 . . . polarization combiner filter
18 . . . mirror
20 . . . second pumping source
20a, 20b . . . laser diode (light source)
23 . . . second pumping port
23a . . . second pumping light propagation fiber
25 . . . second optical filter
26 . . . laser module
27 . . . polarization combiner filter
28 . . . mirror
30 . . . amplification optical fiber
35 . . . core
36 . . . cladding 37 ... external cladding
38 ... protection cover layer
41 ... first optical coupler
42 ... second optical coupler
51 ... first FBG
52 ... second FBG
61 ... first resonance port
62 ... second resonance port
70 ... seed light source
71 ... seed light port
72 ... output port
75 ... light emitter

The invention claimed is:

1. An optical fiber amplifier comprising:
a first pumping source configured to output a first pumping light at a first wavelength;
a second pumping source configured to output a second pumping light at a second wavelength different from the first wavelength;
an amplification optical fiber including:
a core in which an active element is doped, the active element being caused in an excited state by the first pumping light and the second pumping light; and
a cladding covering the core,
the first pumping light output from the first pumping source entering one end of the amplification optical fiber and the second pumping light output from the second pumping source entering other end of the amplification optical fiber;
a first optical filter disposed on an optical path from the first pumping source to the one end of the amplification optical fiber and configured to transmit a light at a wavelength the same as a wavelength of the first pumping light and reflect a light at a wavelength the same as a wavelength of the second pumping light; and
a second optical filter disposed on an optical path from the second pumping source to the other end of the amplification optical fiber and configured to transmit a light at a wavelength the same as a wavelength of the second pumping light and reflect at a wavelength the same as a wavelength of the first pumping light,
a first pumping light propagation fiber coupled to a light source of the first pumping source and the cladding of the amplification optical fiber, and
a second pumping light propagation fiber coupled to a light source of the second pumping source and the cladding of the amplification optical fiber,
wherein the first optical filter is disposed between the light source of the first pumping source and the first pumping light propagation fiber, and the second optical filter is disposed between the light source of the second pumping source and the second pumping light propagation fiber.

2. The optical fiber amplifier according to claim 1, wherein the first pumping light and the second pumping light enter the cladding of the amplification optical fiber.

3. The optical fiber amplifier according to claim 2, wherein the first pumping source and the second pumping source are formed of a plurality of light sources,
a plurality of the first pumping light propagation fibers is further included, the first pumping light propagation fibers being individually coupled to the light sources of the first pumping source and the cladding of the amplification optical fiber,
the first optical filter is disposed between the respective light sources of the first pumping sources and the respective first pumping light propagation fibers,
a plurality of the second pumping light propagation fibers is further included, the second pumping light propagation fibers being individually couple to the light sources of the second pumping source and the cladding of the amplification optical fiber, and
the second optical filter is disposed between the respective light sources of the second pumping sources and the respective second pumping light propagation fibers.

4. The optical fiber amplifier according to claim 3, wherein the second pumping light is absorbed in the active element more than the first pumping light is.

5. The optical fiber amplifier according to claim 4, wherein a wavelength of the second pumping light is a wavelength at which absorption efficiency of the active element is excellent more than a wavelength of the first pumping light.

6. The optical fiber amplifier according to claim 4, wherein power of the second pumping light is stronger than power of the first pumping light, and
wherein the other end of the amplification optical fiber is an output end of the amplification optical fiber for outputting an amplified light.

7. The optical fiber amplifier according to claim 4, wherein a wavelength of the second pumping light is longer than a wavelength of the first pumping light.

8. A fiber laser apparatus comprising:
the optical fiber amplifier according to claim 2;
a first mirror coupled to the core of the amplification optical fiber on one end side of the amplification optical fiber and configured to reflect a light having at least a part of a wavelength of a light of spontaneous emission emitted from the active element; and
a second mirror coupled to the core of the amplification optical fiber on the other end side of the amplification optical fiber and configured to reflect a light at a wavelength the same as a wavelength of a light reflected off the first mirror at a reflectance lower than a reflectance of the first mirror.

9. The fiber laser apparatus according to claim 8, wherein the first pumping source and second pumping source are formed of a plurality of light sources,
a plurality of the first pumping light propagation fibers is further included, the first pumping light propagation fibers being individually coupled to the light sources of the first pumping source and the cladding of the amplification optical fiber,
the first optical filter is disposed between the respective light sources of the first pumping sources and the respective first pumping light propagation fibers,
a plurality of the second pumping light propagation fibers is further included, the second pumping light propagation fibers being individually coupled to the light sources of the second pumping source and the cladding of the amplification optical fiber, and
the second optical filter is disposed between the respective light sources of the second pumping sources and the respective second pumping light propagation fibers.

10. The fiber laser apparatus according to claim 9, wherein the second pumping light is absorbed in the active element more than the first pumping light is.

11. The fiber laser apparatus according to claim 10, wherein a wavelength of the second pumping light is a wavelength at which absorption efficiency of the active element is excellent more than a wavelength of the first pumping light.

12. The fiber laser apparatus according to claim 10, wherein power of the second pumping light is stronger than power of the first pumping light, and wherein the other end of the amplification optical fiber is an output end of the amplification optical fiber for outputting an amplified light.

13. The fiber laser apparatus according to claim 10, wherein a wavelength of the second pumping light is longer than a wavelength of the first pumping light.

14. A fiber laser apparatus comprising:
the optical fiber amplifier according to claim 2, wherein
a seed light is input from the one end side of the amplification optical fiber to the core, and
an output light in which the seed light is amplified is output from the other end side of the amplification optical fiber.

15. The fiber laser apparatus according to claim 14, wherein
the first pumping source and second pumping source are formed of a plurality of light sources,
a plurality of the first pumping light propagation fibers is further included, the first pumping light propagation fibers being individually coupled to the light sources of the first pumping source and the cladding of the amplification optical fiber,
the first optical filter is disposed between the respective light sources of the first pumping sources and the respective first pumping light propagation fibers,
a plurality of the second pumping light propagation fibers is further included, the second pumping light propagation fibers being individually coupled to the light sources of the second pumping source and the cladding of the amplification optical fiber, and
the second optical filter is disposed between the respective light sources of the second pumping sources and the respective second pumping light propagation fibers.

16. The fiber laser apparatus according to claim 15, wherein the second pumping light is absorbed in the active element more than the first pumping light is.

17. The fiber laser apparatus according to claim 16, wherein a wavelength of the second pumping light is a wavelength at which absorption efficiency of the active element is excellent more than a wavelength of the first pumping light.

18. The fiber laser apparatus according to claim 16, wherein power of the second pumping light is stronger than power of the first pumping light, and
wherein the other end of the amplification optical fiber is an output end of the amplification optical fiber for outputting an amplified light.

19. The fiber laser apparatus according to claim 16, wherein a wavelength of the second pumping light is longer than a wavelength of the first pumping light.

20. The optical fiber amplifier according to claim 1, wherein
the light source of the first pumping source includes a laser diode configured to output the first pumping light and a condenser lens,
the light source of the second pumping source includes a laser diode configured to output the second pumping light and a condenser lens,
the first pumping light propagation fiber is configured to input a light output from the light source of the first pumping source to the cladding of the amplification optical fiber at the one end thereof,
the second pumping light propagation fiber is configured to input a light output from the light source of the second pumping source to the cladding of the amplification optical fiber at the other end thereof,
a light output from the laser diode of the first pumping source is collected on the first optical filter through the condenser lens of the first pumping source, and input from the first optical filter to the first pumping light propagation fiber, and
a light output from the laser diode of the second pumping source is collected on the second optical filter through the condenser lens of the second pumping source, and input from the second optical filter to the second pumping light propagation fiber.

21. The optical fiber amplifier according to claim 1, wherein
the light source of the first pumping source includes a laser diode configured to output the first pumping light, a collimating lens, and a condenser lens,
the light source of the second pumping source includes a laser diode configured to output the second pumping light, a collimating lens, and a condenser lens,
the first pumping light propagation fiber is configured to input a light output from the light source of the first pumping source to the cladding of the amplification optical fiber at the one end thereof,
the second pumping light propagation fiber is configured to input a light output from the light source of the second pumping source to the cladding of the amplification optical fiber at the other end thereof,
a light output from the laser diode of the first pumping source is collimated at the collimating lens of the first pumping source, transmitted through the first optical filter, collected at the condenser lens of the first pumping source, and input to the first pumping light propagation fiber, and
a light output from the laser diode of the second pumping source is collimated at the collimating lens of the second pumping source, transmitted through the second optical filter, collected at the condenser lens of the second pumping source, and input to the second pumping light propagation fiber.

22. The optical fiber amplifier according to claim 1, wherein
the light source of the first pumping source includes a pair of laser diodes configured to output the first pumping light, a pair of collimating lenses, a composite filter, and a condenser lens,
the light source of the second pumping source includes a pair of laser diodes configured to output the second pumping light, a pair of collimating lenses, a composite filter, and a condenser lens,
the first pumping light propagation fiber is configured to input a light output from the light source of the first pumping source to the cladding of the amplification optical fiber at the one end thereof,
the second pumping light propagation fiber is configured to input a light output from the light source of the second pumping source to the cladding of the amplification optical fiber at the other end thereof,
lights output from the laser diodes of the first pumping source are collimated at the collimating lenses of the first pumping source, combined at the composite filter of the first pumping source, transmitted through the first optical filter, collected at the condenser lens of the first pumping source, and input to the first pumping light propagation fiber, and
lights output from the laser diodes of the second pumping source are collimated at the collimating lenses of the second pumping source, combined at the composite filter of the second pumping source, transmitted through the second optical filter, collected at the condenser lens of the second pumping source, and input to the second pumping light propagation fiber.

23. The optical fiber amplifier according to claim 22, wherein
the laser diodes of the first pumping source emit respective first pumping lights whose polarization directions are orthogonal to each other,
the laser diodes of the second pumping source emit respective second pumping lights whose polarization directions are orthogonal to each other, and
the composite filters of the first pumping source and the second pumping source are a polarization composite filter.

24. The optical fiber amplifier according to claim 22, wherein
the laser diodes of the first pumping source emit respective first pumping lights whose wavelengths are different from each other,
the laser diodes of the second pumping source emit respective second pumping lights whose wavelengths are different from each other, and
the composite filters of the first pumping source and the second pumping source are a wavelength composite filter.

25. The optical fiber amplifier according to claim 1, wherein
the light source of the first pumping source includes a pair of laser diodes configured to output the first pumping light, a pair of collimating lenses, a mirror, and a condenser lens,
the light source of the second pumping source includes a pair of laser diodes configured to output the second pumping light, a pair of collimating lenses, a mirror, and a condenser lens,
the first pumping light propagation fiber is configured to input a light output from the light source of the first pumping source to the cladding of the amplification optical fiber at the one end thereof,
the second pumping light propagation fiber is configured to input a light output from the light source of the second pumping source to the cladding of the amplification optical fiber at the other end thereof,
a light output from one of the laser diodes of the first pumping source is collimated at one of the collimating lenses of the first pumping source, transmitted through the first optical filter, collected at the condenser lens of the first pumping source, and input at one part of a region of an end surface of the first pumping light propagation fiber, and a light output from the other of the laser diodes of the first pumping source is collimated at the other of the collimating lenses of the first pumping source, reflected in the mirror, transmitted through the first optical filter, collected at the condenser lens of the first pumping source, and input at the other part of the region of the end surface of the first pumping light propagation, and
a light output from one of the laser diodes of the second pumping source is collimated at one of the collimating lenses of the second pumping source, transmitted through the second optical filter, collected at the condenser lens of the second pumping source, and input at one part of a region of an end surface of the second pumping light propagation fiber, and a light output from the other of the laser diodes of the second pumping source is collimated at the other of the collimating lenses of the second pumping source, reflected in the mirror, transmitted through the second optical filter, collected at the condenser lens of the second pumping source, and input at the other part of the region of the end surface of the second pumping light propagation fiber.

* * * * *